US009792043B2

(12) United States Patent
Subramanian et al.

(10) Patent No.: US 9,792,043 B2
(45) Date of Patent: Oct. 17, 2017

(54) METHODS AND SYSTEMS FOR EFFICIENTLY STORING DATA

(71) Applicant: NETAPP, INC., Sunnyvale, CA (US)

(72) Inventors: Ananthan Subramanian, San Ramon, CA (US); Anil Paul Thoppil, Sunnyvale, CA (US); Sunitha Sunil Sankar, Cupertino, CA (US); Cheryl Marie Thompson, Sunnyvale, CA (US)

(73) Assignee: NETAPP, INC., Sunnyvale, CA (US)

( * ) Notice: Subject to any disclaimer, the term of this patent is extended or adjusted under 35 U.S.C. 154(b) by 107 days.

(21) Appl. No.: 14/994,924

(22) Filed: Jan. 13, 2016

(65) Prior Publication Data
US 2017/0199675 A1    Jul. 13, 2017

(51) Int. Cl.
G06F 3/06 (2006.01)
G06F 12/02 (2006.01)

(52) U.S. Cl.
CPC ............ *G06F 3/0608* (2013.01); *G06F 3/065* (2013.01); *G06F 3/067* (2013.01); *G06F 3/0619* (2013.01); *G06F 3/0652* (2013.01); *G06F 3/0665* (2013.01); *G06F 12/0253* (2013.01)

(58) Field of Classification Search
None
See application file for complete search history.

(56) References Cited

U.S. PATENT DOCUMENTS

| | | | |
|---|---|---|---|
| 9,558,073 B2 | 1/2017 | Cantwell et al. | |
| 9,575,974 B2 | 2/2017 | Muthyala et al. | |
| 9,612,768 B2 | 4/2017 | Katiyar et al. | |
| 9,613,046 B1 | 4/2017 | Xu et al. | |
| 2003/0115439 A1* | 6/2003 | Mahalingam | G06F 17/30079 712/1 |
| 2010/0281230 A1* | 11/2010 | Rabii | G06F 3/0605 711/165 |
| 2012/0317337 A1* | 12/2012 | Johar | G06F 12/0246 711/103 |
| 2012/0330903 A1 | 12/2012 | Periyagaram et al. | |
| 2013/0297872 A1* | 11/2013 | Hyde, II | G06F 3/0611 711/117 |
| 2017/0031772 A1 | 2/2017 | Subramanian et al. | |
| 2017/0031940 A1 | 2/2017 | Subramanian et al. | |
| 2017/0068472 A1 | 3/2017 | Periyagaram et al. | |

OTHER PUBLICATIONS

Non-Final Ofice Action on co-pending U.S. Appl. No. 14/994,971 dated Apr. 27, 2017.

* cited by examiner

*Primary Examiner* — Gary W Cygiel
(74) *Attorney, Agent, or Firm* — Klein, O'Neill & Singh, LLP

(57) ABSTRACT

Methods and systems for a networked storage environment are provided. One method includes scanning a first data structure by a processor executing instructions out of a memory for a storage operating system to determine whether any data chunk of a first object stored at a first storage tier is referenced by the storage operating; when the storage operating system references a certain number of data chunks, the processor using an object staging data structure to identify a second object that is in the process of being built with space for transferring the certain number of data chunks from the first object to the second object; and updating information regarding the second object at a transfer log with location information of the certain number of data chunks at the first storage tier.

20 Claims, 13 Drawing Sheets

METHODS AND SYSTEMS FOR EFFICIENTLY STORING DATA

TECHNICAL FIELD

The present disclosure relates to networked storage environments, and more particularly, to efficiently storing data at object based data stores.

BACKGROUND

Various forms of storage systems are used today. These forms include direct attached storage, network attached storage (NAS) systems, storage area networks (SANs), and others. Storage systems are commonly used for a variety of purposes, such as providing multiple users with access to shared data, backing up data and others.

A storage system typically includes at least one computing system (may also be referred to as a "server" or "storage server") executing a storage operating system configured to store and retrieve data on behalf of one or more client computing systems at one or more storage devices. The storage operating system exports data stored at storage devices as a storage volume. A storage volume is a logical data set which is an abstraction of physical storage, combining one or more physical mass storage devices or parts thereof into a single logical storage object. Continuous efforts are being made to efficiently store data.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

In one aspect, methods and systems for a networked storage environment are provided. One method includes scanning a first data structure by a processor executing instructions out of a memory for a storage operating system to determine whether any data chunk of a first object stored at a first storage tier is referenced by the storage operating; when the storage operating system references a certain number of data chunks, the processor using an object staging data structure to identify a second object that is in the process of being built with space for transferring the certain number of data chunks from the first object to the second object; and updating information regarding the second object at a transfer log with location information of the certain number of data chunks at the first storage tier.

Figure 1:
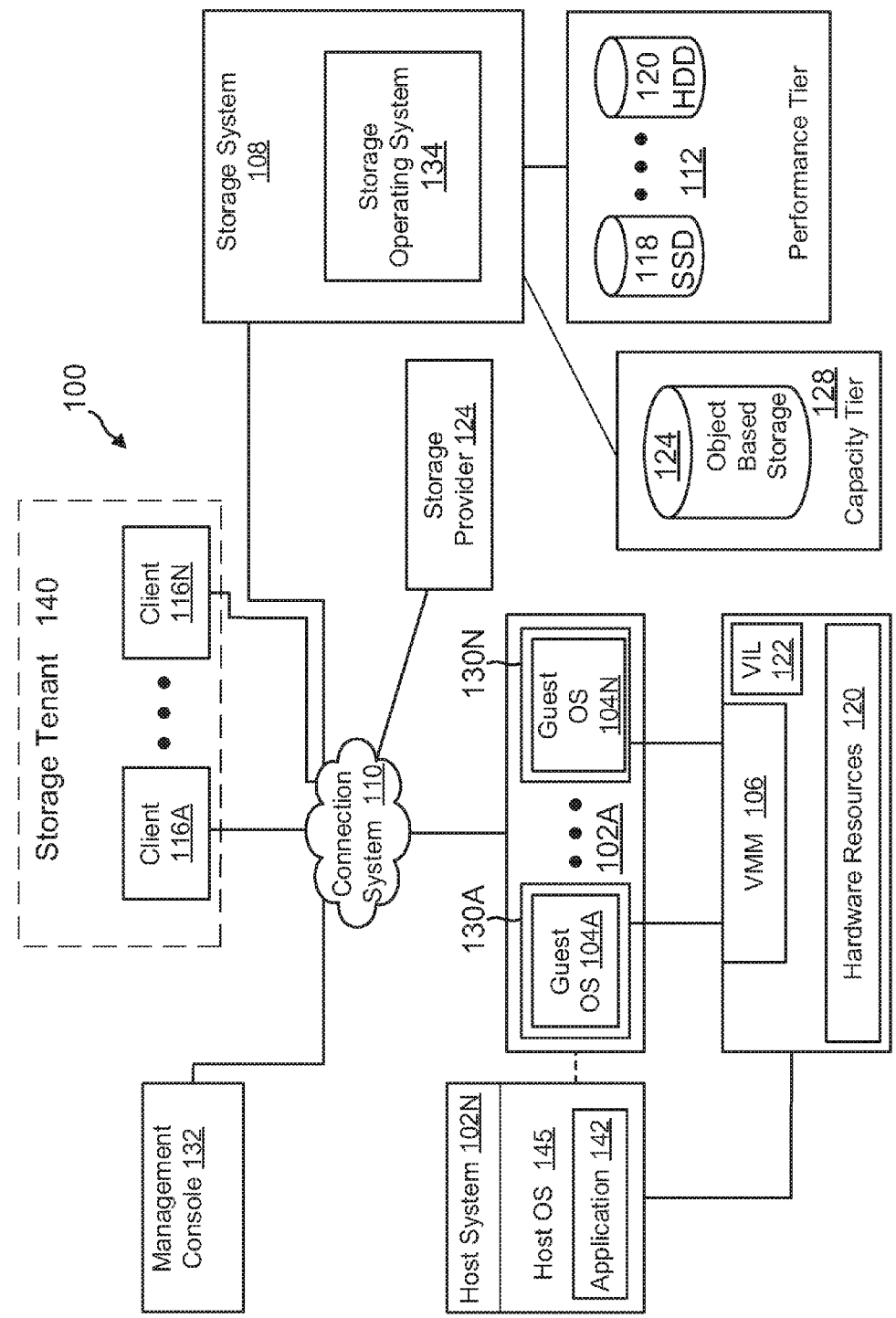
FIG. 1 shows an example of an operating environment for the various aspects disclosed herein.

System 100:

FIG. 1 shows an example of a networked storage environment 100 (also referred to as system 100), for implementing the various adaptive aspect of the present disclosure. System 100 may include a plurality of computing devices 102A-102N (may also be referred to individually as a host platform/system 102 or simply as server 102) communicably coupled to a storage system (or storage server) 108 that executes a storage operating system 134 via a connection system 110 such as a local area network (LAN), wide area network (WAN), the Internet and others. As described herein, the term "communicably coupled" may refer to a direct connection, a network connection, or other connections to enable communication between devices.

As an example, host system 102A may execute a plurality of virtual machines (VMs) in a virtual environment that is described below in detail. Host 102N may execute one or more application 142, for example, a database application (for example, Oracle application), an email application (Microsoft Exchange) and others that use the storage system 108 to store information. Host 102N also executes an operating system 145, for example, a Windows based operating system, Linux, Unix and others (without any derogation of any third party trademark rights).

Clients 116A-116N (may be referred to as client (or user) 116) are computing devices that can access storage space at the storage system 108. A client can be the entire system of a company, a department, a project unit or any other entity. Each client is uniquely identified and optionally, may be a part of a logical structure called a storage tenant 140. The storage tenant 140 represents a set of users (may be referred to as storage consumers) for a storage provider 124 (may also be referred to as a cloud manager, where cloud computing is being utilized). Where a storage provider 124 is being used, the client accesses storage through the storage provider. It is noteworthy that the adaptive aspects of the present disclosure are not limited to using a storage provider or a storage tenant and may be implemented for direct client access.

In one aspect, storage system 108 has access to a first set of mass storage devices 118-120 within at least one storage subsystem 112 that is referred to as a performance tier, a hybrid storage device system. The mass storage devices 118 may include solid state drives (SSDs), while the mass storage devices 120 may include writable storage device media such as hard disk drives (HDD), magnetic disks, video tape, optical, DVD, magnetic tape, and any other similar media adapted to store information. The storage devices 118-120 may be organized as one or more groups of Redundant Array of Independent (or Inexpensive) Disks (RAID). The various aspects disclosed are not limited to any particular storage device type or storage device configuration.

The storage system also has access to an object based storage 124 at a capacity tier 128. The term object as defined herein means a chunk of data (having one or more blocks of data) is written together in an object storage tier. The object based storage 124 may be slower than the performance tier 112 storage. In one aspect, data stored at the object store 124 is managed using an object identifier and an offset value within the object, as described below in detail. The capacity tier 128 may be used in a cloud based environment. The adaptive aspects described herein however are not limited to the cloud based environment.

As an example, the storage system 108 may provide a set of logical storage volumes (or logical unit numbers (LUNs)) that presents storage space to clients and VMs for storing information. Each volume may be configured to store data files (or data containers or data objects), scripts, word processing documents, executable programs, and any other type of structured or unstructured data. From the perspective of one of the client systems, each volume can appear to be a single drive. However, each volume can represent storage space at one storage device, an aggregate of some or all of the storage space in multiple storage devices, a RAID group, or any other suitable set of storage space.

The storage operating system 134 organizes storage space at the performance tier 112 as one or more "aggregate", where each aggregate is identified by a unique identifier and a location. Within each aggregate, one or more storage volumes are created whose size can be varied. A qtree, sub-volume unit may also be created within the storage volumes. As a special case, a qtree may be an entire storage volume.

The storage system 108 may be used to store and manage information at storage devices in either the performance tier 112 or the capacity tier 128 based on a request. The request may be based on file-based access protocols, for example, the Common Internet File System (CIFS) protocol or Network File System (NFS) protocol, over TCP/IP. Alternatively, the request may use block-based access protocols, for example, iSCSI and SCSI encapsulated over Fibre Channel (FCP).

To facilitate access to storage space, the storage operating system 134 implements a file system that logically organizes stored information as a hierarchical structure for files/directories/objects at the storage devices. Each "on-disk" file may be implemented as set of blocks configured to store information, such as text, whereas a directory may be implemented as a specially formatted file in which other files and directories are stored. These data blocks are organized within a volume block number (VBN) space that is maintained by a file system of the storage operating system 134 described below in detail. The file system may also assign each data block in the file a corresponding "file offset" or file block number (FBN). The file system typically assigns sequences of FBNs on a per-file basis, whereas VBNs are assigned over a larger volume address space. The file system organizes the data blocks within the VBN space as a logical volume. The file system typically consists of a contiguous range of VBNs from zero to n, for a file system of size n−1 blocks.

An example of storage operating system 134 is the Data ONTAP™ storage operating system available from NetApp, Inc. that implements a Write Anywhere File Layout (WAFL) file system (without derogation of any trademark rights of NetApp Inc.). Of course, the various aspects disclosed herein are not limited to any specific file system type and maybe implemented by other file systems.

The storage operating system 134 may further implement a storage module (for example, a RAID system for performance tier 112) that manages the storage and retrieval of the information to and from storage devices in accordance with input/output (I/O) operations. When accessing a block of a file in response to servicing a client request, the file system specifies a VBN that is translated at the file system/RAID system boundary into a disk block number (DBN) location on a particular storage device (disk, DBN) within a RAID group of the physical volume. Each block in the VBN space and in the DBN space is typically fixed, e.g., 4 k bytes (kB), in size; accordingly, there is typically a one-to-one mapping between the information stored on the disks in the DBN space and the information organized by the file system in the VBN space.

A requested block is retrieved from a storage device and stored in a buffer cache of a memory of the storage system 108 as part of a buffer tree of the file. The buffer tree is an internal representation of blocks for a file stored in the buffer cache and maintained by the file system. Broadly stated and as described below in detail, the buffer tree has an inode at the root (top-level) of the file, as described below.

An inode is a data structure used to store information, such as metadata, about a file, whereas the data blocks are structures used to store the actual data for the file. The information in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Each pointer may be embodied as a VBN to facilitate efficiency among the file system and the RAID system when accessing the data.

Volume information (volinfo) and file system information (fsinfo) blocks specify the layout of information in the file system, the latter block including an inode of a file that includes all other inodes of the file system (the inode file). Each logical volume (file system) has an fsinfo block that is preferably stored at a fixed location within, e.g., a RAID group. The inode of the fsinfo block may directly reference (point to) blocks of the inode file or may reference the indirect blocks of the inode file that, in turn, reference direct blocks of the inode file. Within each direct block of the inode file are embedded inodes, each of which may reference indirect blocks that, in turn, reference data blocks (also shown as L0 blocks) of a file. An example of an inode and a buffer tree are provided below.

In a typical mode of operation, a client transmits one or more input/output (I/O) commands, such as a CFS or NFS request, over connection system 110 to the storage system 108. Storage system 108 receives the request, issues one or more I/O commands to storage devices to read or write the data on behalf of the client system, and issues a CIFS or NFS response containing the requested data over the network 110 to the respective client system.

As an example, system 100 may also include a virtual machine environment where a physical resource is time-shared among a plurality of independently operating processor executable virtual machines (VMs). Each VM may function as a self-contained platform, running its own operating system (OS) and computer executable, application software. The computer executable instructions running in a VM may be collectively referred to herein as "guest software." In addition, resources available within the VM may be referred to herein as "guest resources."

The guest software expects to operate as if it were running on a dedicated computer rather than in a VM. That is, the guest software expects to control various events and have access to hardware resources on a physical computing system (may also be referred to as a host platform) which maybe referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

Host platform 102A includes/provides a virtual machine environment executing a plurality of VMs 130A-130N that may be presented to client computing devices/systems 116A-116N. VMs 130A-130N execute a plurality of guest OS 104A-104N (may also be referred to as guest OS 104) that share hardware resources 120. Application 142 may be executed within VMs 130. As described above, hardware resources 120 may include storage, CPU, memory, I/O devices or any other hardware resource.

In one aspect, host platform 102A interfaces with a virtual machine monitor (VMM) 106, for example, a processor executed Hyper-V layer provided by Microsoft Corporation of Redmond, Wash., a hypervisor layer provided by VMWare Inc., or any other type. VMM 106 presents and manages the plurality of guest OS 104A-104N executed by the host platform 102. The VMM 106 may include or interface with a virtualization layer (VIL) 122 that provides one or more virtualized hardware resource to each OS 104A-104N.

In one aspect, VMM 106 is executed by host platform 102A with VMs 130A-130N. In another aspect, VMM 106 may be executed by an independent stand-alone computing system, referred to as a hypervisor server or VMM server and VMs 130A-130N are presented at one or more computing systems.

It is noteworthy that different vendors provide different virtualization environments, for example, VMware Corporation, Microsoft Corporation and others. Data centers may have hybrid virtualization environments/technologies, for example, Hyper-V and hypervisor based virtual environment. The generic virtualization environment described above with respect to FIG. 1 may be customized depending on the virtual environment to implement the aspects of the present disclosure. Furthermore, VMM 106 (or VIL 122) may execute other modules, for example, a storage driver, network interface and others, the details of which are not germane to the aspects described herein and hence have not been described in detail. The virtualization environment may use different hardware and software components and it is desirable for one to know an optimum/compatible configuration.

In one aspect, system 100 provides a management console 132 for configuring and managing the various components of system 100. As an example, the management console may be implemented as or include one or more application programming interface (API). The APIs may be implemented as REST APIs, where REST means "Representational State Transfer". REST is a scalable system used for building web services. REST systems/interface may use HTTP (hyper-text transfer protocol) or other protocols for communicating.

Although storage system 108 is shown as a stand-alone system, i.e. a non-cluster based system, in another aspect, storage system 108 may have a distributed architecture; for example, a cluster based system that is described below in detail with respect to FIG. 2A.

Clustered System:

Before describing the various aspects of the present disclosure, the following describes a clustered networked storage environment 200. FIG. 2A shows a cluster based storage environment 200 having a plurality of nodes operating as resources to store data on behalf of clients at either the performance tier 112 or the capacity tier 128.

Storage environment 200 may include a plurality of client systems 204.1-204.N as part of or associated with storage tenant 140, a clustered storage system 202 (similar to storage system 108) and at least a network 206 communicably connecting the client systems 204.1-204.N, the management console 132, the storage (or cloud) provider 124 and the clustered storage system 202. It is noteworthy that these components may interface with each other using more than one network having more than one network device.

The clustered storage system 202 includes a plurality of nodes 208.1-208.3, a cluster switching fabric 210, and a plurality of mass storage devices in the performance tier 112.1-112.3 (similar to performance tier 112). The nodes may also store data at capacity tier 128, as described below in detail.

Each of the plurality of nodes 208.1-208.3 is configured to include a network module, a storage module, and a management module, each of which can be implemented as a processor executable module. Specifically, node 208.1 includes a network module 214.1, a storage module 216.1, and a management module 218.1, node 208.2 includes a network module 214.2, a storage module 216.2, and a management module 218.2, and node 208.3 includes a network module 214.3, a storage module 216.3, and a management module 218.3.

The network modules 214.1-214.3 include functionality that enable the respective nodes 208.1-208.3 to connect to one or more of the client systems 204.1-204.N (or the management console 132) over the computer network 206. The network modules handle file network protocol processing (for example, CFS, NFS and/or iSCSI requests). The storage modules 216.1-216.3 connect to one or more of the storage devices at the performance tier and/or the capacity tier and process I/O requests. Accordingly, each of the plurality of nodes 208.1-208.3 in the clustered storage server arrangement provides the functionality of a storage server.

The management modules 218.1-218.3 provide management functions for the clustered storage system 202. The management modules 218.1-218.3 collect storage information regarding storage devices.

A switched virtualization layer including a plurality of virtual interfaces (VIFs) 219 is provided to interface between the respective network modules 214.1-214.3 and the client systems 204.1-204.N, allowing storage space at the storage devices associated with the nodes 208.1-208.3 to be presented to the client systems 204.1-204.N as a single shared storage pool.

The clustered storage system 202 can be organized into any suitable number of storage virtual machines (SVMs) (may be referred to as virtual servers (may also be referred to as "SVMs"), in which each SVM represents a single storage system namespace with separate network access. A SVM may be designated as a resource on system 200. Each SVM has a client domain and a security domain that are separate from the client and security domains of other SVMs. Moreover, each SVM is associated with one or more VIFs 219 and can span one or more physical nodes, each of which can hold one or more VIFs and storage associated with one or more SVMs. Client systems can access the data on a SVM from any node of the clustered system, through the VIFs associated with that SVM.

Each of the nodes 208.1-208.3 is defined as a computing system to provide application services to one or more of the client systems 204.1-204.N. The nodes 208.1-208.3 are interconnected by the switching fabric 210, which, for example, may be embodied as a Gigabit Ethernet switch or any other type of switching/connecting device.

Figure 2A:
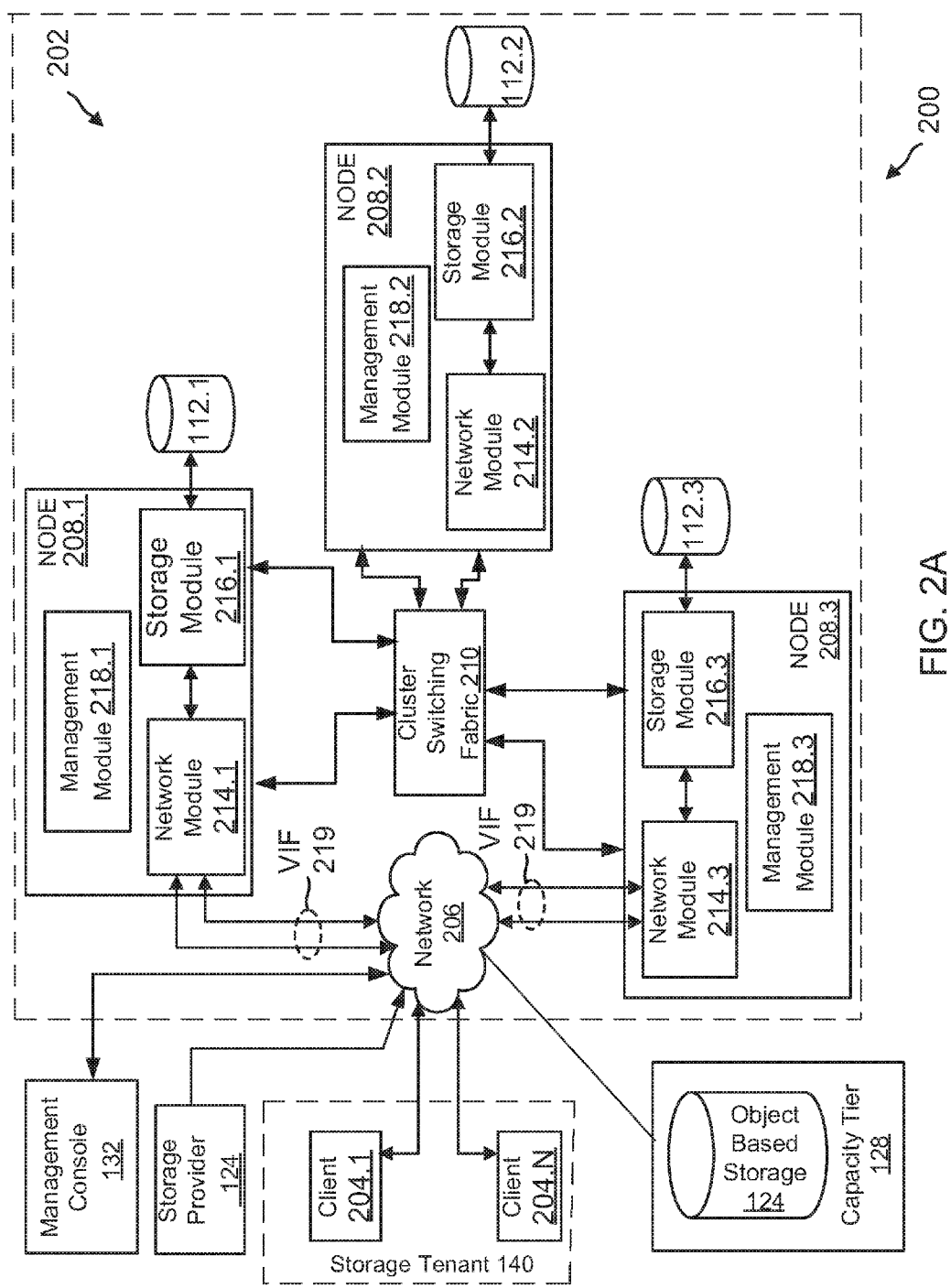
FIG. 2A shows an example of a clustered storage system, used according to one aspect of the present disclosure.

Although FIG. 2A depicts an equal number (i.e., 3) of the network modules 214.1-214.3, the storage modules 216.1-216.3, and the management modules 218.1-218.3, any other suitable number of network modules, storage modules, and management modules may be provided. There may also be different numbers of network modules, storage modules, and/or management modules within the clustered storage system 202. For example, in alternative aspects, the clustered storage system 202 may include a plurality of network modules and a plurality of storage modules interconnected in a configuration that does not reflect a one-to-one correspondence between the network modules and storage modules. In another aspect, the clustered storage system 202 may only include one network module and storage module.

Each client system 204.1-204.N may request the services of one of the respective nodes 208.1, 208.2, 208.3, and that node may return the results of the services requested by the client system by exchanging packets over the computer network 206, which may be wire-based, optical fiber, wireless, or any other suitable combination thereof.

Figure 2B:
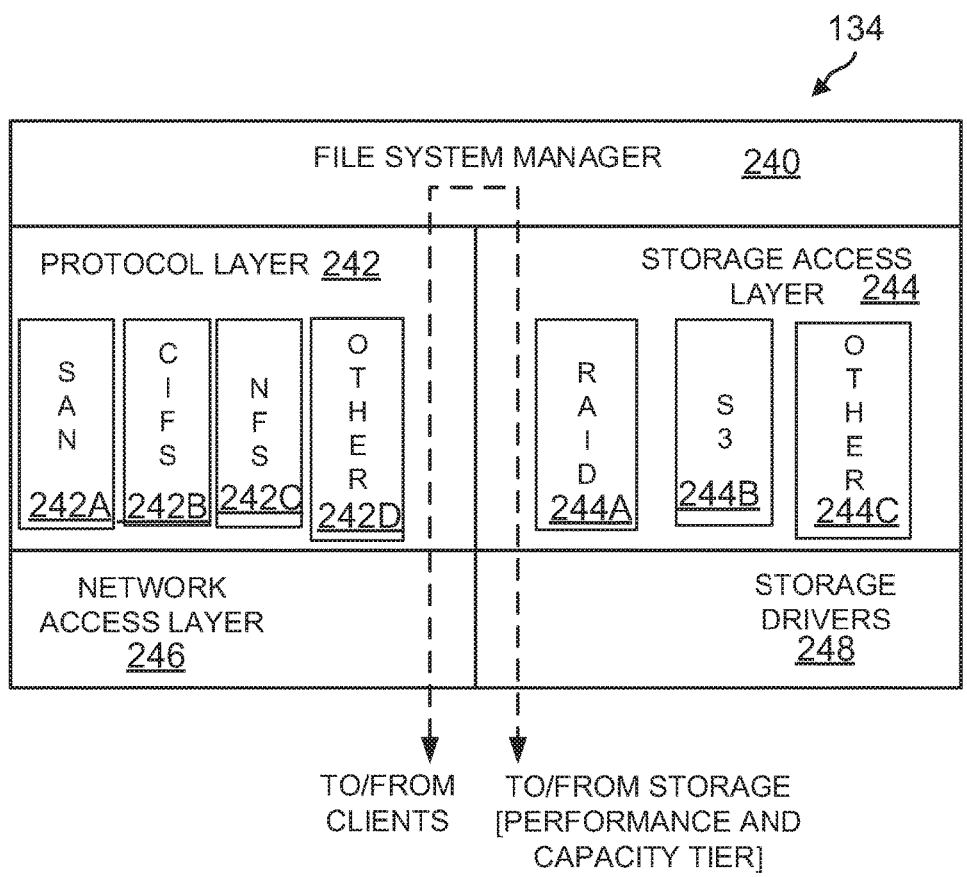
FIG. 2B shows an example of a storage operating system, used according to one aspect of the present disclosure.

Storage Operating System:

FIG. 2B illustrates a generic example of storage operating system 134 (FIG. 1) executed by node 208.1, according to one aspect of the present disclosure. In one example, storage operating system 134 may include several modules, or "layers" executed by one or both of network module 214 and storage module 216. These layers include a file system manager 240 that keeps track of a hierarchical structure of the data stored in storage devices and manages read/write operation, i.e. executes read/write operation on storage in response to client 204.1/204.N requests, as described below in detail.

Storage operating system 134 may also include a protocol layer 242 and an associated network access layer 246, to allow node 208.1 to communicate over a network with other systems, such as clients 204.1/204.N. Protocol layer 242 may implement one or more of various higher-level network protocols, such as SAN (e.g. iSCSI) (242A), CIFS (242B), NFS (242C), Hypertext Transfer Protocol (HTTP) (not shown), TCP/IP (not shown) and others (242D).

Network access layer 246 may include one or more drivers, which implement one or more lower-level protocols to communicate over the network, such as Ethernet. Interactions between clients' and mass storage devices are illustrated schematically as a path, which illustrates the flow of data through storage operating system 134.

The storage operating system 134 may also include a storage access layer 244 and an associated storage driver layer 248 to allow storage module 216 to communicate with a storage device. The storage access layer 244 may implement a higher-level storage protocol, such as RAID (redundant array of inexpensive disks) (244A), a S3 layer 244B to access the capacity tier 128 described below in detail, and other layers 244C. The storage driver layer 248 may implement a lower-level storage device access protocol, such as FC or SCSI. The storage driver layer 248 may maintain various data structures (not shown) for storing information regarding storage volume, aggregate and various storage devices.

As used herein, the term "storage operating system" generally refers to the computer-executable code operable on a computer to perform a storage function that manages data access and may, in the case of a node 208.1, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a storage device directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present disclosure may be utilized with any suitable file system, including a write in place file system.

Figure 3:
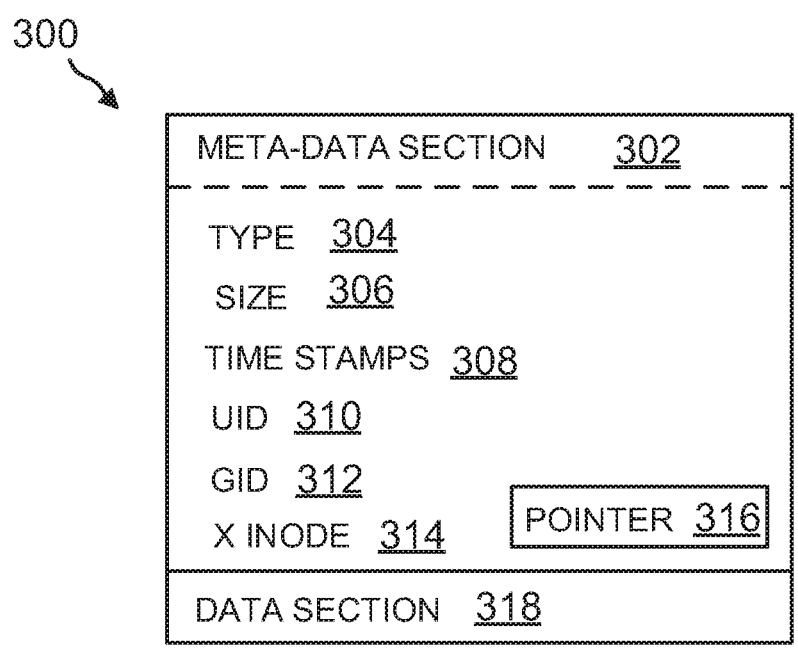
FIG. 3 shows an example of an inode, used according to one aspect of the present disclosure.

Inode Structure:

FIG. 3 shows an example of an inode structure 300 (may also be referred to as inode 300) used to store data at the performance tier 112 according to one aspect of the present disclosure. Inode 300 may include a meta-data section 302 and a data section 318. The information stored in the meta-data section 302 of each inode 300 describes a file and, as such, may include the file type (e.g., regular, directory or object) 304, size 306 of the file, time stamps (e.g., access and/or modification) 308 for the file and ownership, i.e., user identifier (UID 310) and group ID (GID 312), of the file. The metadata section 302 may also include a X-inode field 314 with a pointer 316 that references another on-disk inode structure containing, e.g., access control list (ACL) information associated with the file or directory.

The contents of data section 318 of each inode 300 may be interpreted differently depending upon the type of file (inode) defined within the type field 304. For example, the data section 318 of a directory inode structure includes meta-data controlled by the file system, whereas the data section of a "regular inode" structure includes user-defined data. In this latter case, the data section 318 includes a representation of the data associated with the file. Data section 318 of a regular on-disk inode file may include user data or pointers, the latter referencing, for example, 4 KB data blocks for storing user data at a storage device.

Inode structure 300 may have a restricted size (for example, 122 bytes). Therefore, user data having a size that is less than or equal to 64 bytes may be represented, in its entirety, within the data section of an inode. However, if the user data is greater than 64 bytes but less than or equal to, for example, 64 kilobytes (KB), then the data section of the inode comprises up to 16 pointers, each of which references a 4 KB block of data stored at a disk. Moreover, if the size of the data is greater than 64 kilobytes but less than or equal to 64 megabytes (MB), then each pointer in the data section 318 of the inode references an indirect inode that contains 1024 pointers, each of which references a 4 KB data block on disk.

Figure 4:
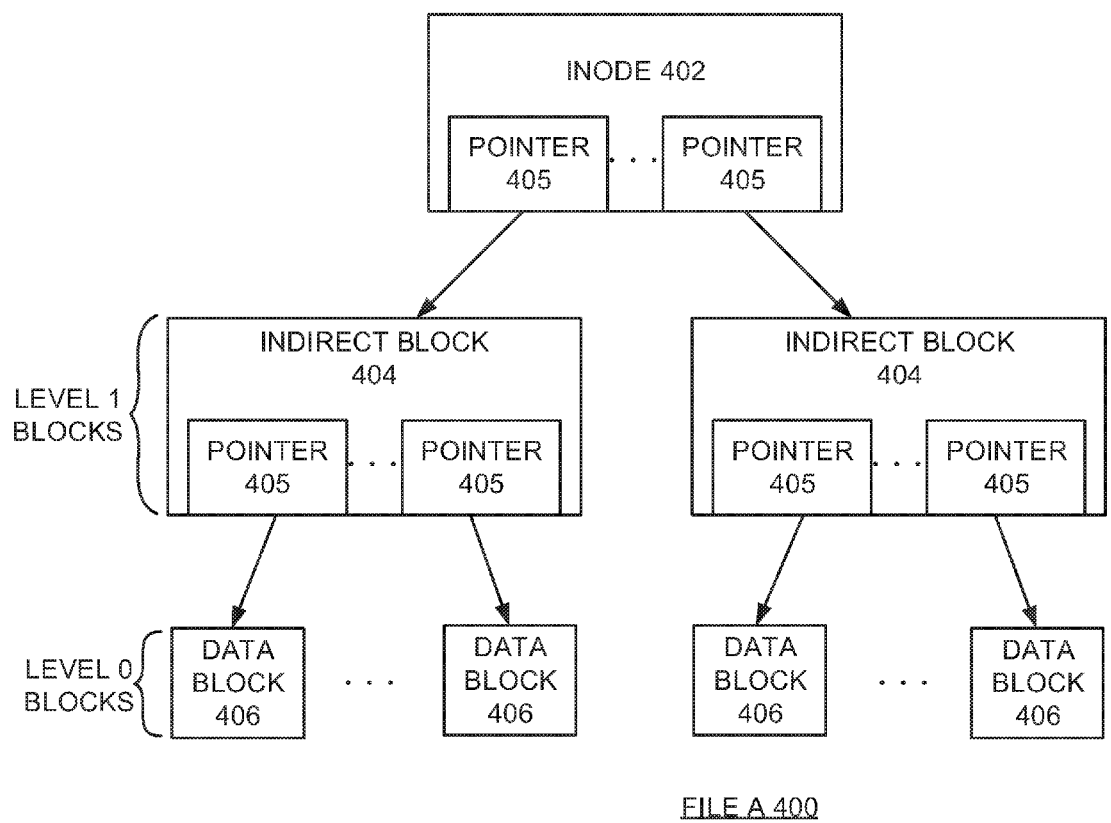
FIG. 4 shows an example of a buffer tree, used according to one aspect of the present disclosure.

Buffer Tree:

FIG. 4 is an example of an inode buffer tree of a data container that may be used by the storage operating system 134. The buffer tree is an internal representation of blocks for a data container (e.g., file A 400) loaded into a buffer cache and maintained by the file system 240. A root (top-level) inode 402, such as an embedded inode, references indirect (e.g., Level 1) blocks 404. The indirect blocks (and inode) contain pointers 405 that ultimately reference data blocks 406 used to store the actual data of file A. That is, the data of file A 400 are contained in data blocks and the locations of these blocks are stored in the indirect blocks of the file. Each Level 1 indirect block 404 may contain pointers to many data blocks. According to the "write anywhere" nature of the file system, these blocks may be located anywhere at the storage devices.

In one aspect, the file system 240 allocates blocks, and frees blocks, to and from a virtual volume (may be referred to as VVOL) of an aggregate. The aggregate, as mentioned above, is a physical volume comprising one or more groups of storage devices, such as RAID groups, underlying one or more VVOLs of the storage system. The aggregate has its own physical volume block number (PVBN) space and maintains metadata, such as block allocation bitmap structures, within that PVBN space. Each VVOL also has its own virtual volume block number (VVBN) space and maintains metadata, such as block allocation bitmap structures, within that VVBN space. Typically, PVBNs are used as block pointers within buffer trees of files (such as file 400) stored in a VVOL.

As an example, a VVOL may be embodied as a container file in an aggregate having L0 (data) blocks that comprise all blocks used to hold data in a VVOL; that is, the L0 data blocks of the container file contain all blocks used by a VVOL. L1 (and higher) indirect blocks of the container file reside in the aggregate and, as such, are considered aggregate blocks. The container file is an internal (to the aggregate) feature that supports a VVOL; illustratively, there is one container file per VVOL. The container file is a hidden file (not accessible to a user) in the aggregate that holds every block in use by the VVOL.

When operating in a VVOL, VVBN identifies a FBN location within the file and the file system uses the indirect blocks of the hidden container file to translate the FBN into a PVBN location within the physical volume, which block can then be retrieved from disk.

Figure 5A:
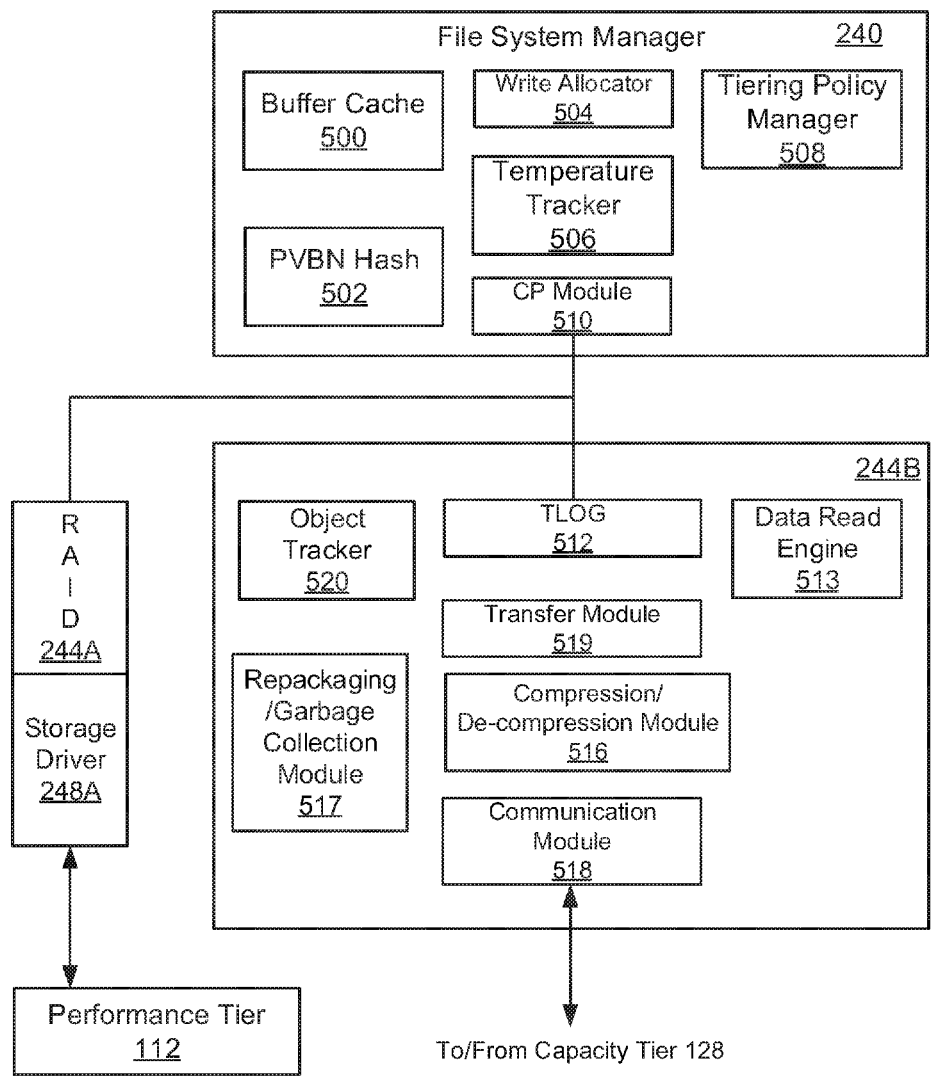
FIG. 5A shows a block diagram of a file system manager; according to one aspect of the present disclosure.

File System 240:

FIG. 5A shows a block diagram of the file system manager 240, according to one aspect of the present disclosure. The file system manager 240 includes a write allocator 504 that allocates blocks for writing data. A buffer cache 500 is used to cache data. A PVBN hash module 502 is used to cache in-copies of blocks indexed by an aggregate identifier and a PVBN. The use of the PVBNs are described below in detail.

A temperature tracker module 506 of the file system 240 tracks the "temperature" of stored data. Hot data is data that is frequently accessed, based on a duration that is defined by the file system manager 240. Cold data is data that is not frequently accessed. The temperature tracker 506 interfaces with the read path to record read hits and determines read patterns. The temperature tracker 506 also interfaces with a tiering policy manager 508 that determines how stored data is tiered, i.e. stored at SSDs 118, HDD 120 or capacity tier 128. The tiering policy manager 508 may store tiering policies that may be used to ascertain where data is to be stored. This information is provided to the temperature tracker 506. The temperature tracker 506 hooks into the buffer cache 500 and PVBN hash 502 to determine which blocks get accessed and how often. Data stored at the performance tier 112 that is categorized as cold may be transferred to the capacity tier 128.

A consistency point (CP) module 510 is used to manage CP operations. In one aspect, when cold data is to be moved to the capacity tier, the data is marked as dirty. The CP module 510 then pushes the dirty data into a transfer log metadata structure 512 (also referred to as TLOG 512) that is described below in detail. The data is moved to the capacity tier 128 via a transfer module 514 and a communication module 518.

The TLOG 512 enables data to be buffered while an object is still being created, as described below in detail. The TLOG 512 may also be used to service read requests for blocks that have not yet been moved to the capacity tier 128 but are in the process of being sent i.e. while an object is being built. Blocks associated with an object in the TLOG 512 are freed only after they have been safely stored and depending on capacity tier properties, verified that they have been stored successfully.

In one aspect, an object tracker 520 finds free usable capacity tier PVBNs efficiently. This is performed by using an object identifier (ID) map that tracks used and unused object IDs. The object ID map is a data structure that is described below in detail with respect to FIG. 5B.

The object tracker 520 ensures that an object is freed when it is no longer needed. This is enabled by a reference count data structure that is also described below in detail with respect to FIG. 5B. The object tracker 520 tracks the reference count of objects in the capacity tier 128 to ensure that the object is not freed until the object is not needed or referenced. For example, if an object is created using 600 4 KB blocks, then the object's reference count at the container file is 600. As the file system deletes or overwrites user data, the reference count is reduced at the container file. When the reference count becomes zero, the object is considered safe to be freed during garbage collection by a repackaging/garbage collection module 517 (may also be referred to as module 517), described below in detail.

In one aspect, the object tracker 520 assists module 517 by providing information regarding objects that may have become fragmented i.e. an object instead of having X number of blocks, only has Y number of blocks, where Y is less than X. For example, if the object can store 1024 blocks of data and only has 100 blocks of data that is referenced by the container file, then the object may be considered fragmented and a candidate for repackaging that is described below with respect to FIG. 6. This may occur because the file system 240 may free certain data or delete certain data over time. In one aspect, the object tracker 520 provides a ratio of current reference count and an original reference count for the object to module 517. When the ratio is low, module 517 may initiate the repackaging process described below in detail.

The data read engine 513 is used fetch data from the capacity tier 128 in response to read requests. The compression module 516 manages compression/de-compression of data stored at the capacity tier. Compression module 516 may be used to compress the data chunks using one or more compression group size, for example, 8 KB, 12 KB, 16 KB or any other size. The same object format is used for storing data chunks that are compressed or uncompressed as described below with respect to FIG. 5C.

The communication module 518 provides S3 APIs that are used to interface with capacity tier storage. The APIs may customized based on the storage vendor providing the capacity tier storage.

The RAID layer 244A using a storage driver 248A, for example, a Fibre Channel driver is used to access the performance tier.

Figure 5B:
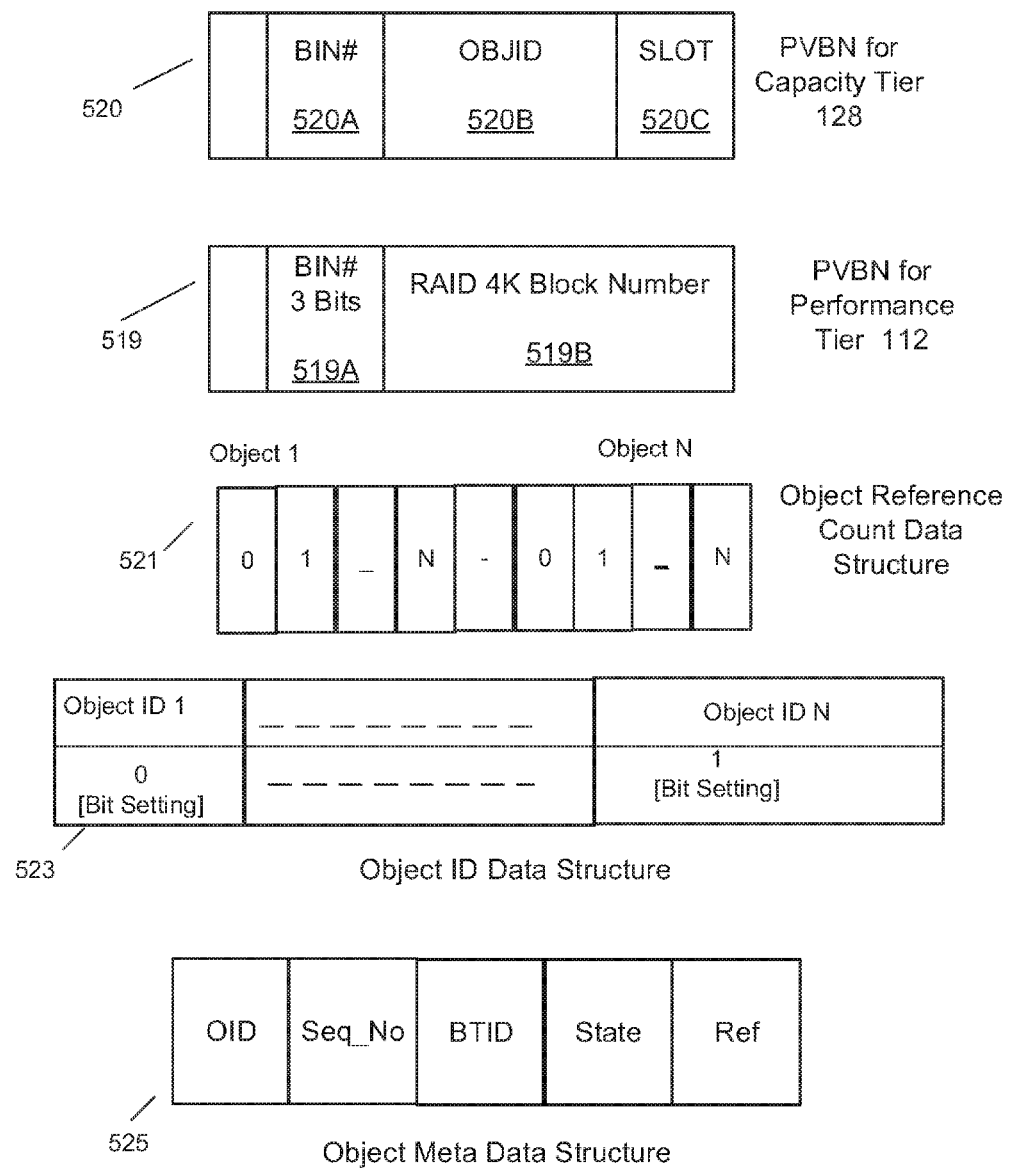
FIG. 5B shows the format for physical volume block numbers (PVBNs) for a performance storage tier and a capacity storage tier, an object reference count data structure, an object ID data structure and an object meta data structure; according to one aspect of the present disclosure.

Data Structure Format:

FIG. 5B shows a format of a capacity tier PVBN 520 and a RAID PVBN 519. The first few bits 520A (for example, 3 bits) of the capacity tier PVBN indicates that the PVBN is for the capacity tier 128. The object_ID (may also be referred to as object ID) 520B provides a unique object identifier, for example, as a 34 bit value. A slot number 520C may be represented as a 10 bit value. The slot number 520C indicates the location of a block within the object. As an example, one object may include 1024, 4 KB blocks. The slot number indicates where a block is within that object having a plurality of blocks.

The RAID PVBN type is indicated by a bit value shown as 519A and the RAID block number is represented by 519B.

FIG. 5B also shows an example of an object reference count data structure 521 (may also be referred to as data structure 521). The data structure 521 may be stored at the performance tier 112 and includes an entry for every object. For example, data structure 521 may include a 32 bit entry for every object and counts the number of slots that are in use by the file system 240. This count is used to trigger the garbage collection process or the repackaging process described below with respect to FIG. 6.

FIG. 5B also shows an object ID data structure/map 523 (may be referred to as data structure 523) that may also be stored at the performance tier 112, according to one aspect of the present disclosure. The data structure 523 stores all the object IDs and have a bit setting indicating if the object ID is currently being used. The data structure 523 is used to determine unused object IDs.

FIG. 5B further shows an object metadata structure 525 (maybe referred to as a data structure 525) stored at performance tier 112, according to one aspect. The data structure 525 is used to translate a capacity tier PVBN to an object ID and offset. The data structure 525 includes an object ID, a sequence number, a BTID (buffer ID of a container file), a state for the object and a reference count. The state of the object may be used to indicate if an object includes compressed or uncompressed data chunks. The reference information may be used to ascertain if an object is a candidate for repackaging, as described below in detail.

Figure 5C:
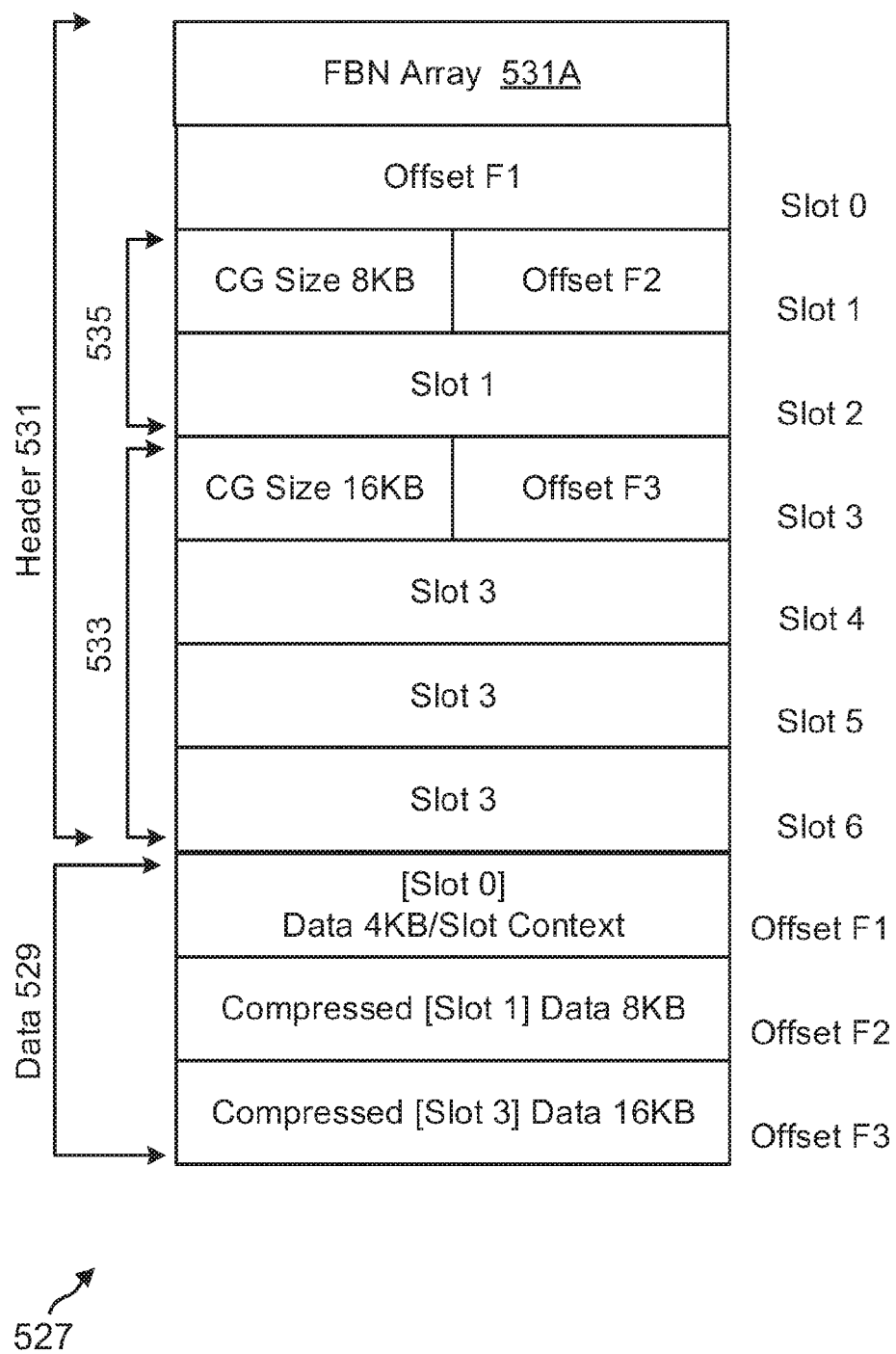
FIG. 5C shows an example of a format for storing data at an object store, according to one aspect of the present disclosure.

Object Format 527:

FIG. 5C shows an example of an object format 527, according to one aspect of the present disclosure. The object format 527 includes a header segment 531 and a data segment 529. The header segment 531 may be configured to include a container file FBN for the data chunk stored at a certain object slot. In one aspect, an array of FBN for each slot are stored in the header segment of the object, shown as 531A. The FBN array 531A may store an identifier for the container file and the VVBN for the data stored within a slot. In another aspect, this information may be stored at a slot context with the stored data, as shown in FIG. 5C.

Object format 527 may also be used for storing data using a plurality of compression group sizes as well as uncompressed data chunks, according to one aspect of the present disclosure. As an example, the compression group size may be 8 KB, 16 KB, 32 KB or any other size. The header segment 531 maps an object slot number to an offset value in the data segment 529. For example, offset F1, slot #0 540 indicates that a first chunk of uncompressed data is stored starting at offset F1. As mentioned above, the header segment 531A may also include information regarding the container file FBN that references the data stored at offset F1. In another aspect, the slot context stored at the slot may be used to store the container file FBN information.

In one aspect, the header segment 531 may also be used to indicate the compression group size. Thus as shown in section 535 a compression group is 8 KB. The compressed chunk starts at offset F2, with slot 1. Slot 2 points to slot 1 indicating that the slot 2 data is part of the compressed chunk that starts from offset F2.

In section 533, the compression group size is 16 KB. In this section, the compressed data chunk begins at offset F3 and slots 4, 5 and 6 all point to slot F3 from where the compressed group begins.

In one aspect, to retrieve a compressed block, the data read engine 513 reads the header, obtains the starting slot number of the compression group and then reads the actual offset of the compression group. The data is then read from the offset and decompressed by the compression/de-compression module 516. In one aspect, the starting slot number of the compression group also stores information regarding the compression type or group size.

To retrieve uncompressed data, the data read engine 513 can simply obtain the slot number from an object metadata structure and retrieve the data.

In one aspect, the object format 527 enables using a same format for storing data chunks that are compressed using more than one compression group size as well as uncompressed data.

Figure 5D:
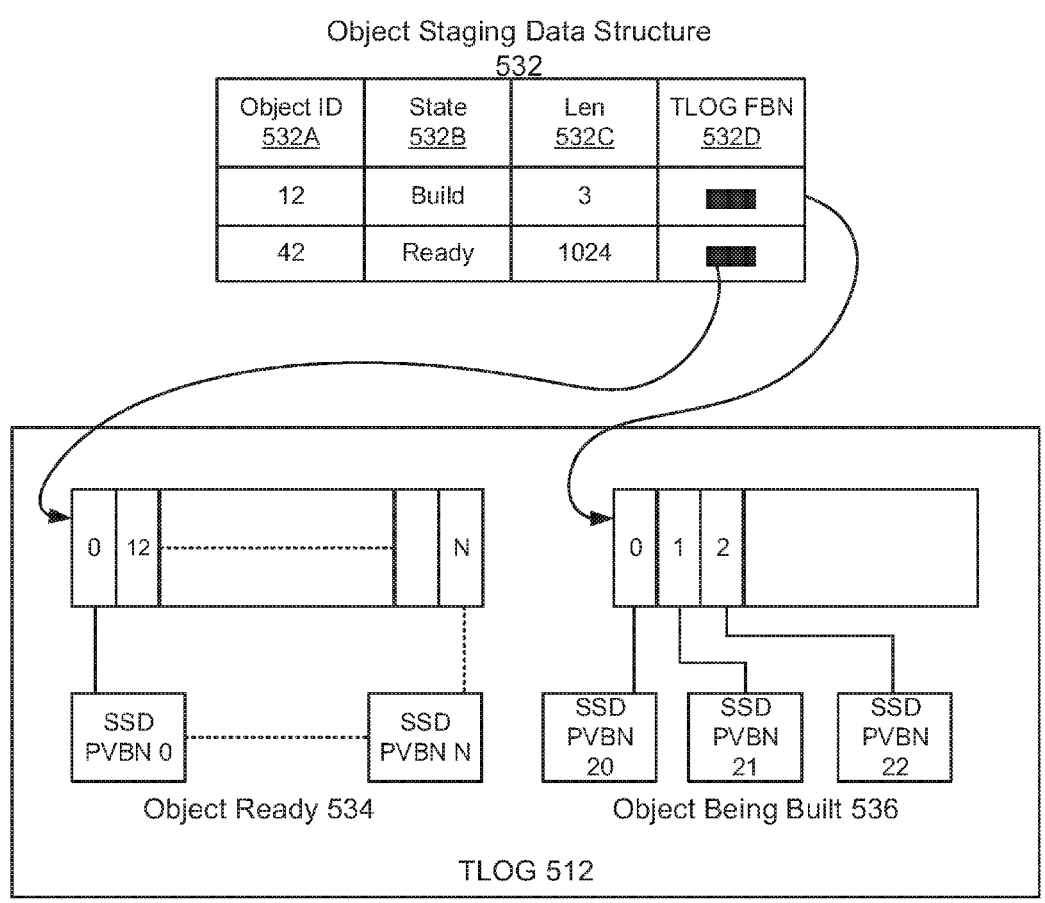
FIG. 5D shows an example of using an object staging data structure.

Object Staging Data Structure 532:

When data has to be written to the capacity tier 128, an object is built to include a plurality of data chunks, for example, 4 KB chunks of data. The object is tracked using the object staging data structure 532 (FIG. 5D). Once one or more objects have been built, the object data is transferred to the capacity tier 128. The storage policy of the capacity tier 128 may dictate that the storage operation be verified, before freeing up the space used by the transferred object at TLOG 512.

FIG. 5D shows an example of using the object staging structure 532 and the TLOG 512, according to one aspect of the present disclosure. The TLOG 512 shows that one object 534 is ready and object 536 is still in the process of being built. The built and in-process objects are tracked by the object staging structure 532 which stores the object ID in column 532A, the state of the object in column 532B (i.e. build or ready), the length of the object (i.e. the number of blocks that are already in the object) in column 532C and a TLOG FBN in column 532D. For example, object 12 is in the process of being built and has three blocks of data at the TLOG FBN 0, 1, 2. The object 42 is ready with 1024 blocks. The SSD PVBN is stored at the respective FBN of the TLOG indicating the PVBN of the performance tier where the data for a chunk resides.

In one aspect, the TLOG 512 may be used to find an object that is not complete and can be used for repackaging a fragmented object. When used for packaging, the TLOG 512 provides the PVBN of the object store 124, because the data chunks for the object are already at the object store 124 and does not have to be transferred from the performance tier 112.

Figure 5E:
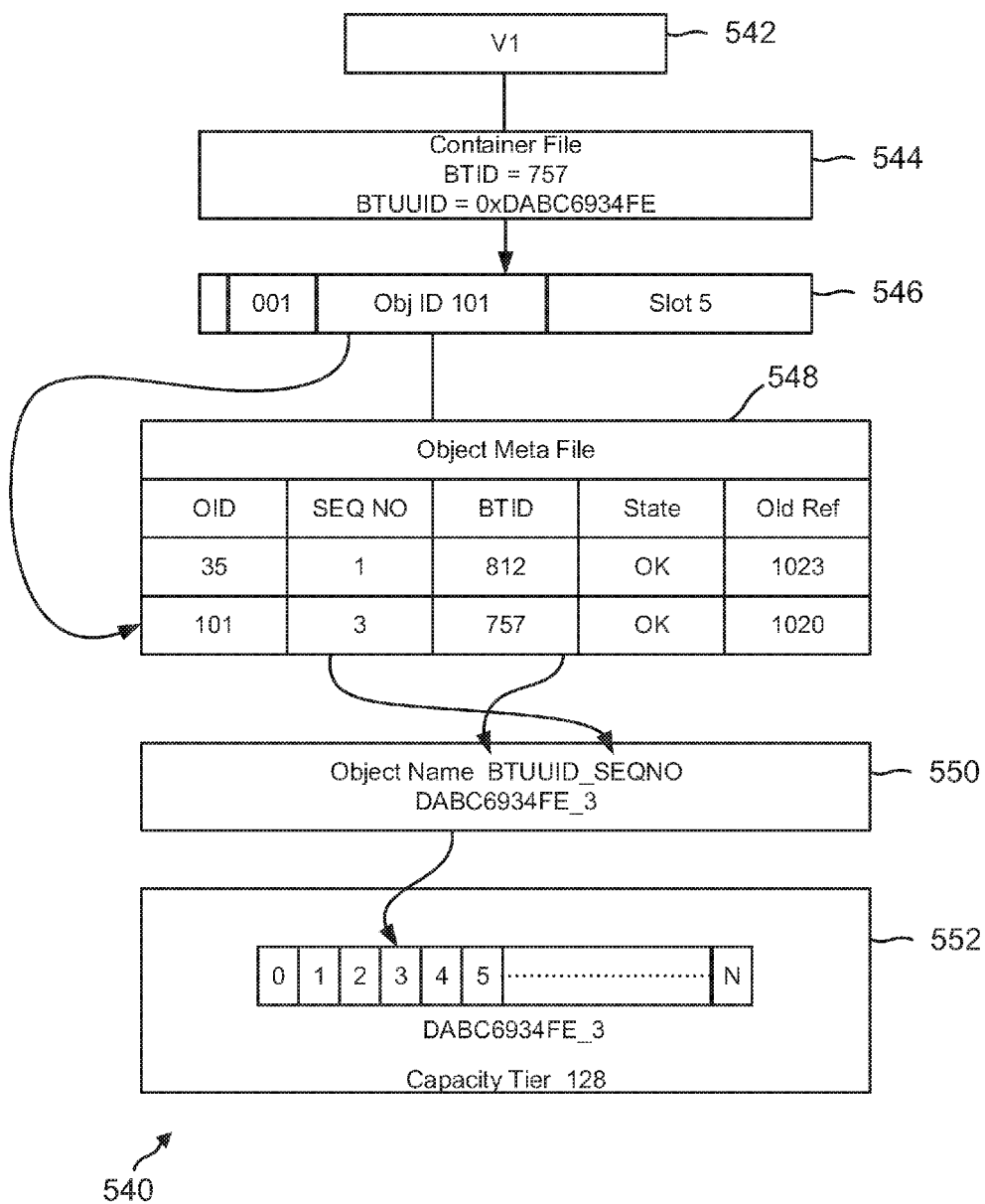
FIG. 5E shows an example of retrieving an object from an object data store, according to one aspect of the present disclosure.

Capacity Tier Access:

FIG. 5E shows an example of accessing data chunks from the capacity tier 128 and using the object metadata structure 548 (similar to data structure 525, shown in FIG. 5B and described above). A read request provides a volume information V1 (shown as 542). V1 is the user data container in a volume. Using V1, the container file for the volume is retrieved (544). The container file has a BTID (buffer ID of a container file) of 757 and a unique identifier (BTUUID) of 0XDABC6934FE. The container file points to an object PVBN (546) that provides an object ID 101 and slot 5.

The object ID is shown in the object metafile 548. As described above, the object metafile 548 includes an object ID, a sequence number, a BTID, a state for the object and a reference count. The state of the object may be used to indicate if a data chunk is compressed or uncompressed. The object name is then shown in block 550, which points to the actual object 552 in the capacity tier 128.

Figure 6:
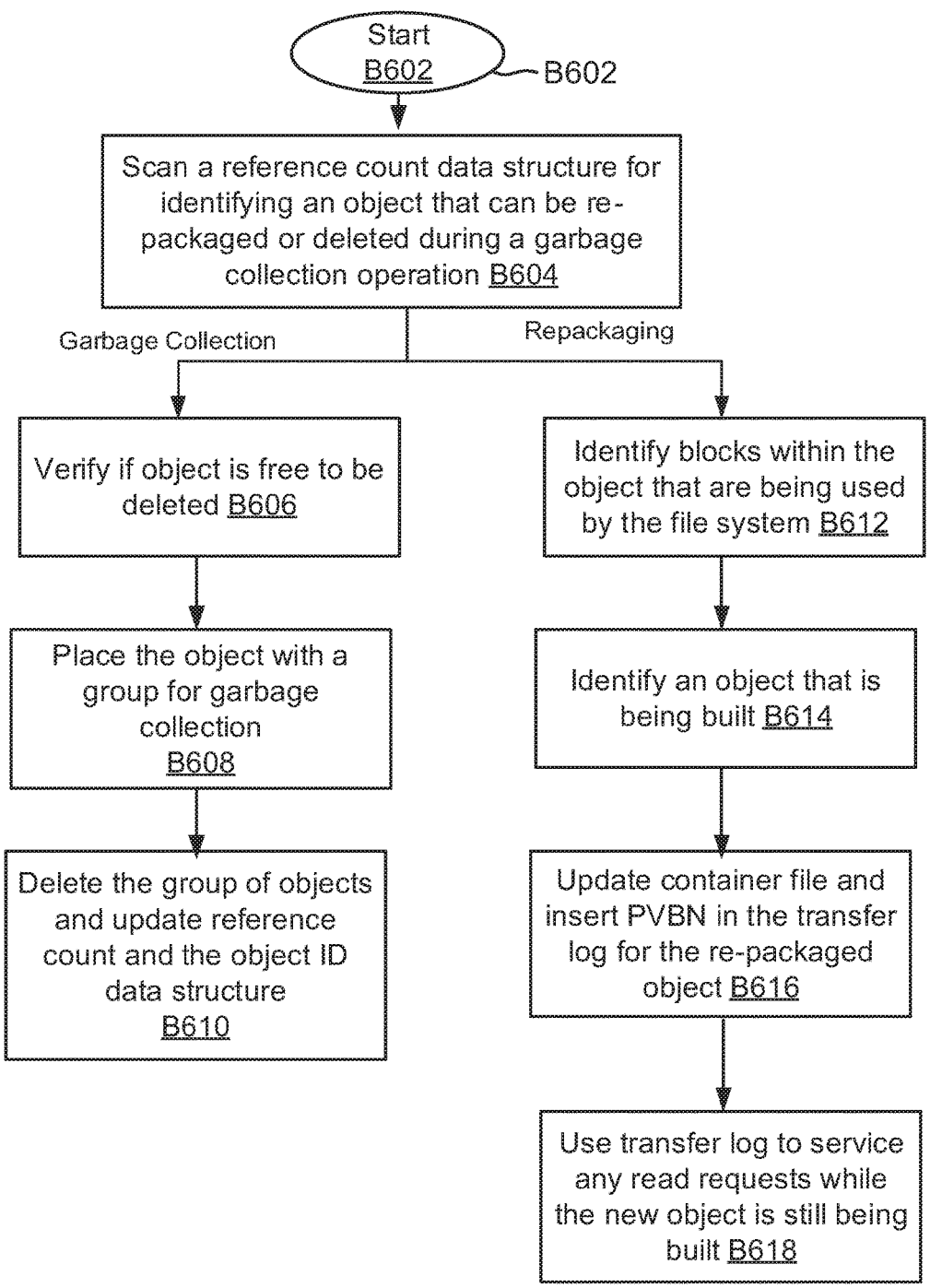
FIG. 6 shows a process for garbage collection and repackaging an object, according to one aspect of the present disclosure.

FIG. 6 shows a process for garbage collection and repackaging an object, according to one aspect of the present disclosure. The process begins in block B602, when complete objects have been stored at the capacity tier 128. Some of the objects may have data that the file system 240 does not reference any more. In that case, the objects may be deleted by module 517.

In other cases, one or more object may become fragmented i.e. may have blocks that are no longer referenced by the file system 240. In that case, the object may be repackaged by module 517. To repackage the object, the data blocks that are being used by the file system 240 are moved to another object that may be in the process of being built. The TLOG 512 is then used to find the appropriate object, as described below in detail.

In one aspect, based on user environment, where a user may have to pay for reads to an object store, module 517 may determine that it may be better to wait for the object to be completely free rather than to repackage. In another aspect, if a volume is being deleted, module 517 may not repackage any data blocks.

In block B604, the object tracker 520 scans data structure 521 to identify a candidate for garbage collection or repackaging. The object tracker 520 reviews the reference count for each data block of an object. If all the reference counts for an object are zero, the object is identified to be a candidate for garbage collection. The garbage collection process is described with respect to blocks B606-B610.

When the reference count for only some of the blocks is zero, then the object may be a candidate for repackaging. For example, assume that an object that has a capacity for storing 1024 4 KB blocks and only 20 blocks are being referenced and the rest are zero. Then the object may be a candidate for repackaging such that the referenced chunks are moved to another object. The threshold value for determining if an object is a candidate for repackaging is based on a number of data blocks that are currently being referenced. The threshold value may be configurable and set based on a storage operating environment. The repackaging process is described below with respect to blocks B612-B618.

For an object identified for garbage collection in block B606, the object tracker 520 verifies if the object ID is still being used. If the object ID is not being used, then nothing needs to be done.

The verification in block B606 is performed by checking data structure 523 to determine if the object ID for the object has been freed or is still being used. This helps to determine if the object still exists at the capacity tier 128 and can be deleted using garbage collection. This decouples the garbage collection process from file system operations because once the system knows an object is completely free, then the object can be deleted at an optimum time without impacting the performance of the file system or the capacity tier 128.

In block B608, the object tracker 5520 notifies module 517 of the object identified for garbage collection. Module 517 maintains a list (not shown) of objects that can be deleted. The list may include one or more objects for deletion. The object group is deleted from the capacity tier 128 in block B610. The object metadata structure 525 [or 548, FIG. 5D] is updated and the garbage collection process ends.

For repackaging, the object tracker 520 identifies the object based on the reference count using data structure 519. In block B612, the blocks within the object that are being referenced by the container file for the volume are identified. This information may be obtained from the object header described above with respect to FIG. 5C. The object header provides the FBNs of the container file that reference specific data blocks of the object. In another aspect, the FBNs are obtained from the slot context. Once the number of blocks that need to be moved or repackaged are identified, module 517 in block B614, finds an object that is in the process of being built. This information is obtained from TLOG 512 using the staging data structure 532, described above in detail.

Once the object that is being built is identified, in block B616, the container file for the object is updated with the new object's PVBN. The object staging data structure 532 is also updated such that the TLOG FBN (532D) points to a capacity tier PVBN where the data is stored. Thereafter, once the object is built, the object written to the capacity tier 128. The object metadata structure 525 and the TLOG 512 are updated indicating the entire object with the repackaged data blocks is at the capacity tier 128.

It is noteworthy that the reference count for the old object becomes zero, after data blocks are moved to the new object. Thus, the old object now becomes a candidate for garbage collection described above in detail.

While the new object is still being built, if a read request is received, then in block B618, the object staging data structure 532 provides the PVBN for the capacity tier 128 where the data blocks are stored.

It is noteworthy that the file system 240 remains consistent during repackaging and there is no need to perform any file system recovery operations, even if the system has to be rebooted during the repackaging operations. In one aspect, by using the TLOG to point to the capacity tier 128, the performance tier 112 is not affected by the repackaging. The data blocks from the capacity tier 128 is only read when the new object is ready to be written at the capacity tier. This is efficient and hence desirable.

In one aspect, methods and systems for a networked storage environment having multiple storage tiers are provided. As an example, one method includes scanning a first data structure (521, FIG. 5B) by a processor executing instructions out of a memory for a storage operating system (134, FIG. 1) to determine whether any data chunk of a first object stored at a first storage tier (i.e. the capacity tier 128) is referenced by the storage operating system. The first data structure maintains a reference count for each data chunk of the first object indicating if the storage operating system is using any data chunk. When the storage operating system references a certain number of data chunks, the processor uses an object staging data structure (532, FIG. 5D) to identify a second object that is in the process of being built with space for transferring the certain number of data chunks from the first object to the second object, where the object staging data structure stores a unique identifier for the second object, and an indicator providing a status for the second object indicating that the object is being built. Thereafter, the method further includes updating information regarding the second object (536, FIG. 5D) at a transfer log (512, FIG. 5D) with location information of the certain number of data chunks at the first storage tier.

The method further includes using the transfer log for responding to any read request for data associated with the certain number of data chunks, before all the data chunks of the second object are stored at the first storage tier.

The method also includes verifying that no data chunk of the first object is being referenced by the storage operating system; determining if an object identifier for the first object is still being used; and identifying the first object as a candidate for deletion. A second data structure (523, FIG. 5B) maintains object identifiers for all objects of the first storage tier with an indicator indicating if each object identifier is currently being used.

Figure 7:
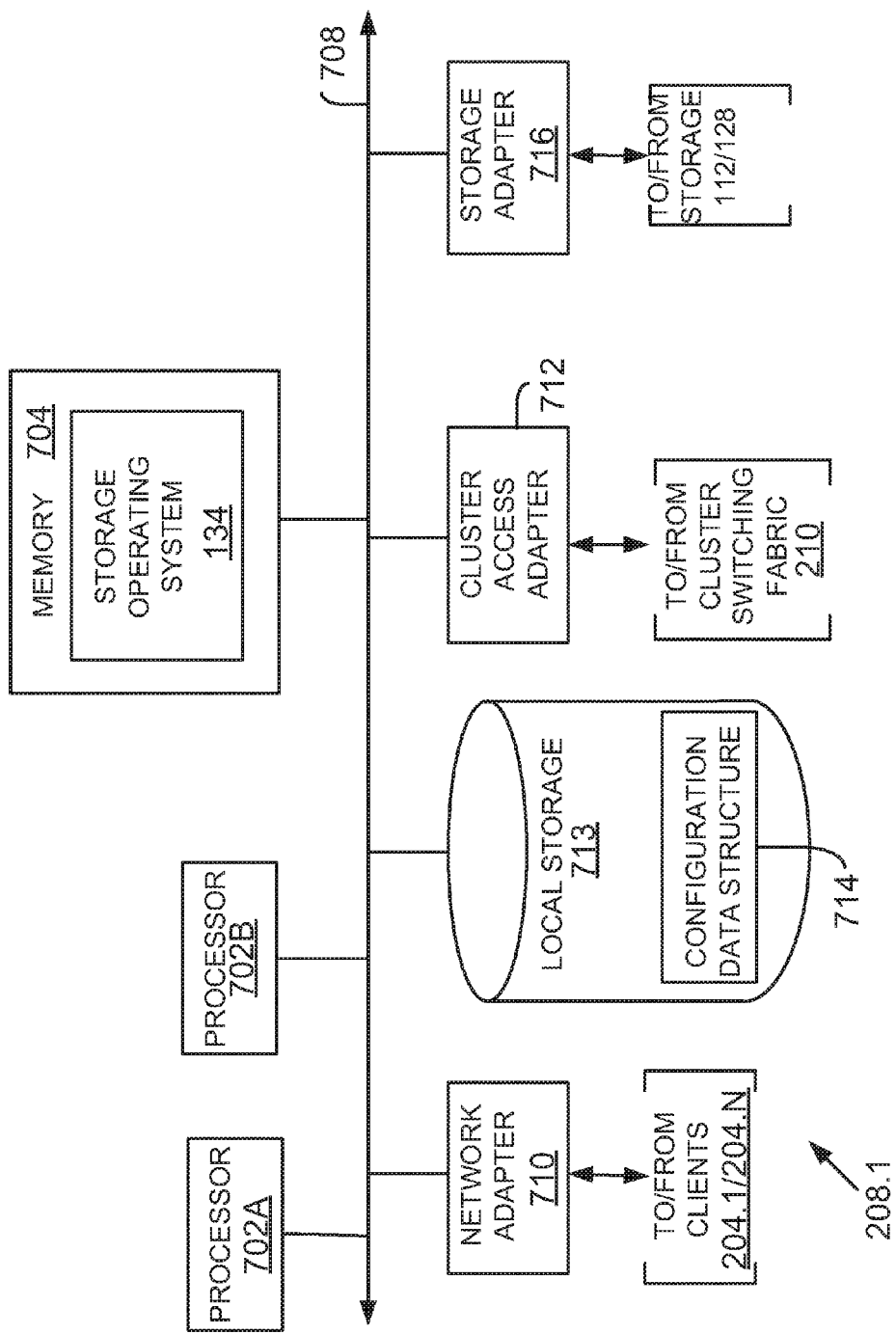
FIG. 7 shows an example of a storage system node, according to one aspect of the present disclosure.

Storage System Node:

FIG. 7 is a block diagram of a node 208.1 that is illustratively embodied as a storage system comprising of a plurality of processors 702A and 702B, a memory 704, a network adapter 710, a cluster access adapter 712, a storage adapter 716 and local storage 713 interconnected by a system bus 708.

Processors 702A-702B may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

The local storage 713 comprises one or more storage devices utilized by the node to locally store configuration information for example, in a configuration data structure 714.

The cluster access adapter 712 comprises a plurality of ports adapted to couple node 208.1 to other nodes of cluster 202. In the illustrative aspect, Ethernet may be used as the clustering protocol and interconnect media, although it will be apparent to those skilled in the art that other types of protocols and interconnects may be utilized within the cluster architecture described herein. In alternate aspects where the network modules and storage modules are implemented on separate storage systems or computers, the cluster access adapter 712 is utilized by the network/storage module for communicating with other network/storage-modules in the cluster 202.

Each node 208.1 is illustratively embodied as a dual processor storage system executing the storage operating system 134 that preferably implements a high-level module, such as a file system 240, to logically organize the information as a hierarchical structure of named directories and files at storage 112/128. However, it will be apparent to those of ordinary skill in the art that the node 208.1 may alternatively comprise a single or more than two processor systems. Illustratively, one processor 702A executes the functions of the network module on the node, while the other processor 702B executes the functions of the storage module.

The memory 704 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the disclosure described herein.

The storage operating system 134 portions of which is typically resident in memory and executed by the processing elements, functionally organizes the node 208.1 by, inter alia, invoking storage operation in support of the storage service implemented by the node.

In one aspect, data that needs to be written is first stored at a buffer location of memory 704. Once the buffer is written, the storage operating system acknowledges the write request. The written data is moved to NVRAM storage and then stored persistently either at the performance tier 112 or the capacity tier 128.

The network adapter 710 comprises a plurality of ports adapted to couple the node 208.1 to one or more clients 204.1/204.N over point-to-point links, wide area networks, virtual private networks implemented over a public network (Internet) or a shared local area network. The network adapter 710 thus may comprise the mechanical, electrical and signaling circuitry needed to connect the node to the network. Each client 204.1/204.N may communicate with the node over network 206 (FIG. 2A) by exchanging discrete frames or packets of data according to pre-defined protocols, such as TCP/IP.

The storage adapter 716 cooperates with the storage operating system 134 executing on the node 208.1 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored at storage device 212.1. The storage adapter 716 comprises a plurality of ports having input/output (I/O) interface circuitry that couples to the storage devices over an I/O interconnect arrangement, such as a conventional high-performance, Fibre Channel link topology.

Figure 8:
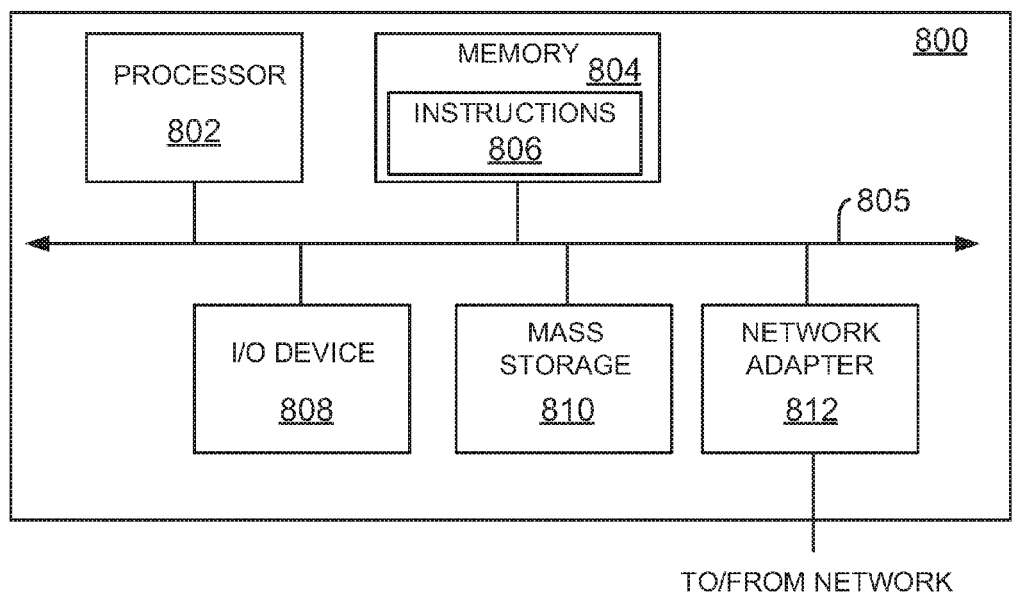
FIG. 8 shows an example of a processing system, used according to one aspect of the present disclosure.

Processing System:

FIG. 8 is a high-level block diagram showing an example of the architecture of a processing system 800 that may be used according to one aspect. The processing system 800 can represent host system 102, management console 132, clients 116, 204 or storage system 108. Note that certain standard and well-known components which are not germane to the present aspects are not shown in FIG. 8.

The processing system 800 includes one or more processor(s) 802 and memory 804, coupled to a bus system 805. The bus system 805 shown in FIG. 8 is an abstraction that represents any one or more separate physical buses and/or point-to-point connections, connected by appropriate bridges, adapters and/or controllers. The bus system 805, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 802 are the central processing units (CPUs) of the processing system 800 and, thus, control its overall operation. In certain aspects, the processors 802 accomplish this by executing software stored in memory 804. A processor 802 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 804 represents any form of random access memory (RAM), read-only memory (ROM), flash memory, or the like, or a combination of such devices. Memory 804 includes the main memory of the processing system 800. Instructions 806 may be used to implement the process steps of FIGS. 5C and 6A described above, may reside in and execute (by processors 802) from memory 804.

Also connected to the processors 802 through the bus system 805 are one or more internal mass storage devices 810, and a network adapter 812. Internal mass storage devices 810 may be, or may include any conventional medium for storing large volumes of data in a non-volatile manner, such as one or more magnetic or optical based disks. The network adapter 812 provides the processing system 800 with the ability to communicate with remote devices (e.g., storage servers) over a network and may be, for example, an Ethernet adapter, a Fibre Channel adapter, or the like.

The processing system 800 also includes one or more input/output (I/O) devices 808 coupled to the bus system 805. The I/O devices 808 may include, for example, a display device, a keyboard, a mouse, etc.

Cloud Computing:

The system and techniques described above are applicable and useful in the upcoming cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer, is a cloud platform and cloud infrastructure, followed by a "server" layer that includes hardware and computer software designed for cloud specific services, for example, the capacity tier 128 is accessible as a cloud service. Details regarding these layers are not germane to the embodiments disclosed herein.

Thus, a method and apparatus for efficiently storing data at a capacity tier in a networked storage environment have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A machine implemented method, comprising:

scanning a first data structure by a processor executing instructions out of a memory for a storage operating system to determine whether any data chunk with one or more blocks of data of a first object having a plurality of data chunks stored at a first storage tier is referenced by the storage operating system;

wherein the first data structure maintains a reference count for each data chunk of the first object indicating if the storage operating system is still using any data chunk and the first data structure is used to determine whether the first object is fragmented and ready for repackaging when a certain number of data chunks of the first object are referenced by the storage operating system or whether the first object is ready for deletion when no data chunk of the first object is being referenced by the storage operating system;

when the storage operating system references the certain number of data chunks, the processor using an object staging data structure to identify a second object that is in the process of being built with enough space to repackage the certain number of data chunks from the first object to the second object and using the second object to store the certain number of data chunks;

wherein the object staging data structure stores a unique identifier for identifying the second object, an indicator providing a status of the second object indicating that the object is being built, a length of the second object indicating a number of existing data blocks that are included in the second object and a transfer log file block number for providing a location within the transfer log where the existing data blocks of the second object are stored; and wherein the transfer log is a temporary data structure that uses the object staging data structure to determine when the second object is complete for storing the second object at the first storage tier with the certain number of data chunks of the first object; and updating information regarding the second object at the transfer log with location information of the certain number of data chunks at the first storage tier.

2. The method of claim 1, further comprising:
using the transfer log for responding to any read request for data associated with the certain number of data chunks, before the second object is stored at the first storage tier.

3. The method of claim 1, wherein the second object includes a data chunk stored at a second storage tier and the second object is transferred to the first storage tier after a certain number of objects, each with a plurality of data chunks are ready for transfer to the first storage tier.

4. The method of claim 3, wherein the first data structure, the object staging structure and the transfer log are stored at the second storage tier having storage devices that are faster than the first storage tier storage devices.

5. The method of claim 1, further comprising:
verifying using the object staging data structure that no data chunk of the first object is being referenced by the storage operating system;
determining if an object identifier for the first object is still being used; and
identifying the first object as a candidate for deletion.

6. The method of claim 5, wherein a second data structure maintains object identifiers for all objects of the first storage tier with an indicator indicating if each object identifier is currently being used.

7. The method of claim 5, wherein the first object is deleted with at least another object as part of a background garbage collection process, executed by the processor.

8. A non-transitory, machine readable medium having stored thereon instructions comprising machine executable code which when executed by a machine, causes the machine to:

scan a first data structure by a processor executing instructions out of a memory for a storage operating system to determine whether any data chunk with one or more blocks of data of a first object having a plurality of data chunks stored at a first storage tier is referenced by the storage operating system;

wherein the first data structure maintains a reference count for each data chunk of the first object indicating if the storage operating system is still using any data chunk and the first data structure is used to determine whether the first object is fragmented and ready for repackaging when a certain number of data chunks of the first object are referenced by the storage operating system or whether the first object is ready for deletion when no data chunk of the first object is being referenced by the storage operating system;

when the storage operating system references the certain number of data chunks, the processor using an object staging data structure to identify a second object that is in the process of being built with enough space to repackage the certain number of data chunks from the first object to the second object and using the second object to store the certain number of data chunks;

wherein the object staging data structure stores a unique identifier for identifying the second object, an indicator providing a status of the second object indicating that the object is being built, a length of the second object indicating a number of existing data blocks that are included in the second object and a transfer log file block number for providing a location within the transfer log where the existing data blocks of the second object are stored; and wherein the transfer log is a temporary data structure that uses the object staging data structure to determine when the second object is complete for storing the second object at the first storage tier with the certain number of data chunks of the first object; and update information regarding the second object at the transfer log with location information of the certain number of data chunks at the first storage tier.

9. The non-transitory, storage medium of claim 8, wherein the machine executable code further causes the machine to:
use the transfer log for responding to any read request for data associated with the certain number of data chunks, before the second object is stored at the first storage tier.

10. The non-transitory, storage medium of claim 8, wherein the second object includes a data chunk stored at a second storage tier and the second object is transferred to the first storage tier after a certain number of objects, each with a plurality of data chunks are ready for transfer to the first storage tier.

11. The non-transitory, storage medium of claim 10, wherein the first data structure, the object staging structure and the transfer log are stored at the second storage tier having storage devices that are faster than the first storage tier storage devices.

12. The non-transitory, storage medium of claim 8, wherein the machine executable code further causes the machine to:
verify using the object staging data structure that no data chunk of the first object is being referenced by the storage operating system;
determine that an object identifier for the first object is still being used; and
identify the first object as a candidate for deletion.

13. The non-transitory, storage medium of claim 12, wherein a second data structure maintains object identifiers for all objects of the first storage tier with an indicator indicating if each object identifier is currently being used.

14. The non-transitory, storage medium of claim 12, wherein the first object is deleted with at least another object as part of a background garbage collection process, executed by the processor.

15. A system, comprising:
a memory containing machine readable medium comprising machine executable code having stored thereon instructions for a storage operating system; and a processor module coupled to the memory, the processor module configured to execute the machine executable code to:
scan a first data structure to determine whether any data chunk with one or more blocks of data of a first object having a plurality of data chunks stored at a first storage tier is referenced by the storage operating system;

wherein the first data structure maintains a reference count for each data chunk of the first object indicating if the storage operating system is still using any data chunk and the first data structure is used to determine whether the first object is fragmented and ready for repackaging when a certain number of data chunks of the first object are referenced by the storage operating system or whether the first object is ready for deletion when no data chunk of the first object is being referenced by the storage operating system;

when the storage operating system references the certain number of data chunks, using an object staging data structure to identify a second object that is in the process of being built with enough space to repackage the certain number of data chunks from the first object to the second object and using the second object to store the certain number of data chunks;

wherein the object staging data structure stores a unique identifier for identifying the second object, an indicator providing a status of the second object indicating that the object is being built, a length of the second object indicating a number of existing data blocks that are included in the second object and a transfer log file block number for providing a location within the transfer log where the existing data blocks of the second object are stored; and wherein the transfer log is a temporary data structure that uses the object staging data structure to determine when the second object is complete for storing the second object at the first storage tier with the certain number of data chunks of the first object; and update information regarding the second object at the transfer log with location information of the certain number of data chunks at the first storage tier.

16. The system of claim 15, wherein the processor module further executes the machine executable code to:

use the transfer log for responding to any read request for data associated with the certain number of data chunks, before the second object is stored at the first storage tier.

17. The system of claim 15, wherein the second object includes a data chunk stored at a second storage tier and the second object is transferred to the first storage tier after a certain number of objects, each with a plurality of data chunks are ready for transfer to the first storage tier.

18. The system of claim 15, wherein the processor module further executes the machine executable code to:

verify using the object staging data structure that no data chunk of the first object is being referenced by the storage operating system;

determine that an object identifier for the first object is no longer being used; and identify the first object as a candidate for deletion.

19. The system of claim 18, wherein a second data structure maintains object identifiers for all objects of the first storage tier with an indicator indicating if each object identifier is currently being used.

20. The system of claim 18, wherein the first object is deleted with at least another object as part of a background garbage collection process, executed by the processor.

* * * * *